US011899907B2

(12) United States Patent
Wang et al.

(10) Patent No.: US 11,899,907 B2
(45) Date of Patent: Feb. 13, 2024

(54) METHOD, APPARATUS AND DEVICE FOR DISPLAYING FOLLOWED USER INFORMATION, AND STORAGE MEDIUM

(71) Applicant: BEIJING BYTEDANCE NETWORK TECHNOLOGY CO., LTD., Beijing (CN)

(72) Inventors: Yuechen Wang, Beijing (CN); Li Song, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 17/600,099

(22) PCT Filed: Feb. 3, 2020

(86) PCT No.: PCT/CN2020/074236
§ 371 (c)(1),
(2) Date: Sep. 30, 2021

(87) PCT Pub. No.: WO2020/207106
PCT Pub. Date: Oct. 15, 2020

(65) Prior Publication Data
US 2022/0197448 A1    Jun. 23, 2022

(30) Foreign Application Priority Data
Apr. 11, 2019 (CN) .......................... 201910290044.5

(51) Int. Cl.
*H04N 21/2187* (2011.01)
*G06F 3/0482* (2013.01)

(52) U.S. Cl.
CPC .................................. *G06F 3/0482* (2013.01)

(58) Field of Classification Search
CPC ............. G06F 3/0482; H04N 21/2187; H04N 21/2743; H04N 21/4788; H04N 21/431
See application file for complete search history.

(56) References Cited

U.S. PATENT DOCUMENTS

2007/0162432 A1    7/2007  Armstrong et al.
2008/0256554 A1*  10/2008  Yassin ...................... G06F 8/24
                                                                   719/315
(Continued)

FOREIGN PATENT DOCUMENTS

CN    103744848 A    4/2014
CN    107168974 A    9/2017
(Continued)

OTHER PUBLICATIONS

Internet WeChat Faction (2018) "Heavyweight! WeChat Subscription is now online!" QQ.com, Jun. 20, 2018 [online] website: https://mp.weixin.qq.com/s?src=11&timestamp=1632640985&ver=3337&signature=OGwnFNTA4MiTcCx8KQ62yuSYChpUllidaF6XCgritp1br-q8dRDrxeRNCViN7NBQ1qE1n7LNQt61FKFyhXLFtmUWhLHQvJ1wAYsXJZq1lj65vdPFnCHdQoSVSMBn9MB8&new=1.
(Continued)

*Primary Examiner* — Hien L Duong
(74) *Attorney, Agent, or Firm* — Faegre Drinker Biddle & Reath LLP

(57) ABSTRACT

Disclosed are a method, an apparatus and a device for displaying followed user information, and a storage medium. The method includes: obtaining an updated video corresponding to at least one followed user in a followed user list; generating a user-dimensional horizontal sliding list corresponding to the at least one followed user according
(Continued)

to the obtained updated video; and displaying the user-dimensional horizontal sliding list in a followed user information display interface.

20 Claims, 7 Drawing Sheets

(56) References Cited

U.S. PATENT DOCUMENTS

| | | | |
|---|---|---|---|
| 2013/0073972 A1 | 3/2013 | Yung et al. | |
| 2014/0229834 A1* | 8/2014 | Jain | H04N 21/47217 715/720 |
| 2015/0245083 A1 | 8/2015 | Schneider et al. | |
| 2016/0323619 A1* | 11/2016 | Lewis | H04N 21/2668 |
| 2017/0094360 A1* | 3/2017 | Keighran | H04N 21/4668 |
| 2018/0005500 A1* | 1/2018 | Robertson | G06Q 10/1091 |
| 2018/0096251 A1* | 4/2018 | Dinu | G06F 3/0482 |
| 2018/0232121 A1* | 8/2018 | Lewis | G06F 3/0485 |
| 2019/0238787 A1* | 8/2019 | Lewis | G06F 3/04842 |
| 2021/0243502 A1* | 8/2021 | Choi | H04N 21/4788 |

FOREIGN PATENT DOCUMENTS

| | | |
|---|---|---|
| CN | 108235086 A | 6/2018 |
| CN | 108881994 A | 11/2018 |
| CN | 108984081 A | 12/2018 |
| CN | 109120981 A | 1/2019 |
| CN | 109889880 A | 6/2019 |

OTHER PUBLICATIONS

Chinese Patent Application No. 201910290044.5, First Office Action dated Jan. 16, 2020, 10 pages.
Chinese Patent Application No. 201910290044.5, Second Office Action dated Mar. 26, 2020, 4 pages.
Chinese Patent Application No. 201910290044.5, Third Office Action dated Nov. 30, 2020, 4 pages.
Chinese Patent Application No. 201910290044.5, Notice of Allowance dated Jan. 15, 2021, 2 pages.
International Patent Application No. PCT/CN2020/074236, International Search Report dated Apr. 27, 2020, 6 page with English Translation.

* cited by examiner

METHOD, APPARATUS AND DEVICE FOR DISPLAYING FOLLOWED USER INFORMATION, AND STORAGE MEDIUM

CROSS-REFERENCE TO RELATED APPLICATIONS

This disclosure is a National Stage of International Application No. PCT/CN2020/074236, filed on Feb. 3, 2020, which claims priority to Chinese Patent Application No. 201910290044.5, filed on Apr. 11, 2019. The disclosures of the aforementioned applications are incorporated by reference in their entireties.

TECHNICAL FIELD

Embodiments of the present disclosure relate to computer technology, for example, to a method, an apparatus and a device for displaying followed user information, and a storage medium.

BACKGROUND

With the rapid development of network small videos, more and more users use small video software to watch or shoot small videos to enrich the entertainment life of the public.

When users watch a small video, they may follow the author who published the video if they are interested in the video, so that when the author publishes a new small video, they can view the new small video in time. In small video software, a form of displaying followed users is to directly display all video dynamics of all followed authors for the user in a followed user information display interface, and present them in a form of a cover list of external videos, and the user can click to enter and view an updated video and continue to swipe up and down to view related videos.

In related technologies, since the video update dynamics of all the followed authors are displayed mixed together, video display efficiency is low, author information is unclear and it is very difficult to capture a key point directly, and even if the videos are sorted according to some indicators, it is still difficult for users to directly select a target. In addition, if there are a lot of followed authors, the number of updated videos will be large, resulting in low presenting efficiency.

SUMMARY

Embodiments of the present disclosure provide a method, an apparatus and a device for displaying followed user information, and a storage medium, so as to improve video display efficiency and user watching experience.

The embodiments of the present disclosure provide a method for displaying followed user information, including:
  obtaining an updated video corresponding to at least one followed user in a followed user list;
  generating, according to the obtained updated video, a user-dimensional horizontal sliding list corresponding respectively to the at least one followed user;
  displaying the user-dimensional horizontal sliding list in a followed user information display interface.

The embodiments of the present disclosure further provide an apparatus for displaying followed user information, the apparatus including:

a video obtaining module, configured to obtain an updated video corresponding to at least one followed user in a followed user list;
  a list generating module, configured to generate, according to the obtained updated video, a user-dimensional horizontal sliding list corresponding respectively to the at least one followed user;
  a list displaying module, configured to display the user-dimensional horizontal sliding list in a followed user information display interface.

The embodiments of the present disclosure further provide a terminal device, the device including:
  one or more processing apparatuses;
  a storage apparatus, configured to store one or more programs;
  the one or more programs, when executed by the one or more processing apparatuses, cause the one or more processing apparatuses to implement the method for displaying followed user information as described in any of the embodiments of the present disclosure.

The embodiments of the present disclosure further provide a computer readable storage medium, having a computer program stored thereon, and when the program is executed by a processing apparatus, the method for displaying followed user information as described in any of the embodiments of the present disclosure is implemented.

DESCRIPTION OF EMBODIMENTS

Figure 1A:
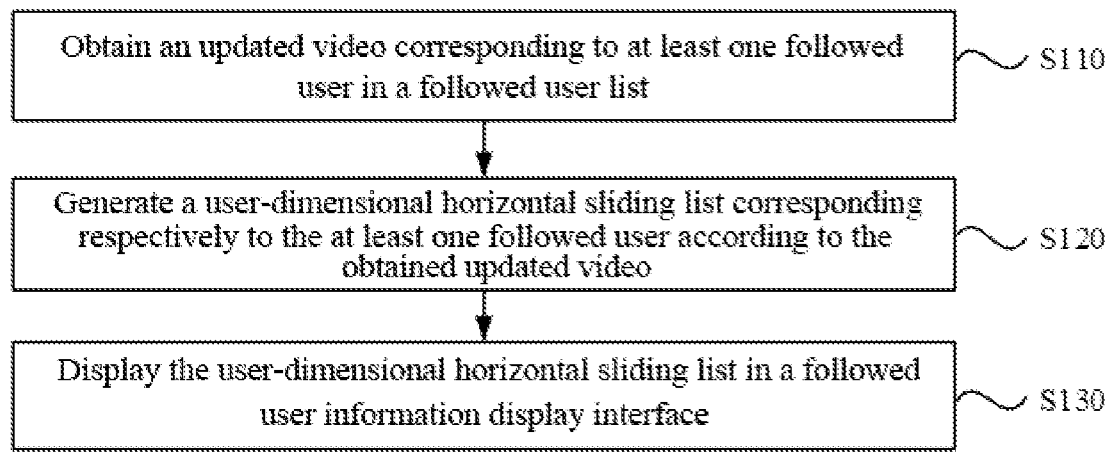
FIG. 1a is a schematic flow diagram of a method for displaying followed user information according to Embodiment 1 of the present disclosure.

The present disclosure will be described below with reference to the drawings and embodiments. The specific embodiments described here are merely used to explain the present disclosure, but not to limit the present disclosure. For the convenience of description, only a part of, rather than all of, the structure related to the present disclosure is shown in the drawings.

In the following embodiments, each embodiment also provides optional features and examples. A plurality of features recorded in the embodiments may be combined to form a plurality of alternative solutions, and each numbered embodiment should not be regarded only as one technical solution.

Embodiment 1

FIG. 1a is a schematic flow diagram of a method for displaying followed user information according to Embodiment 1 of the present disclosure. The method may be applied to a situation of performing dynamic display of updated videos of followed users, the method may be executed by a terminal device such as a mobile phone or a tablet computer running a small video application client, and includes the following steps:

S110, obtain an updated video corresponding to at least one followed user in a followed user list.

In the present embodiment, a user may log in to a small video application client through a registered account password, etc., to watch or publish a small video on the client, and meanwhile, the user may also follow an author of a video which the user is interested in and add the author to a followed user list as a followed user. When the added followed user publishes a new video, it can be shown to the user in time as an updated video for the user to watch.

In related technologies, updated videos of all followed users are displayed mixed together. For example, when a user adds a plurality of followed users, and each followed user updates a new video relative to the last time the user opened the client, then the updated videos of the plurality of followed users will be displayed in an order of update time, and under each updated video, a user identity of the followed user who uploaded the updated video will be marked. Such a display manner will reduce the display efficiency of the updated videos, and in addition, since the updated videos corresponding to the video authors, i.e., the followed users are displayed mixed together, it is inconvenient for the user to view. If the user only wants to watch the updated videos of one of the followed users, the user needs to look through them one by one, and it is difficult for the user to directly select a target one, which degrades user watching experience.

In order to solve the above problem, the present embodiment may first obtain each followed user from a followed user list added by the user, and pull the updated video corresponding to each followed user from the server, and then display the updated videos according to different followed users, where the updated video corresponding to a followed user may be a video that a client user has not clicked and watched, or a video published by the followed user within a preset time period, or a preset number of videos published by the followed user, which is not limited herein.

Optionally, obtaining an updated video corresponding to at least one followed user in the followed user list, includes: pulling, according to an upload time in an order of near-to-far from a current system time, a preset number of videos corresponding to at least one followed user in the followed user list from a server as updated videos.

Illustratively, if there are five followed users added to the followed user list, the preset number of latest uploaded videos, for example, 8 videos uploaded recently, corresponding to the five followed users, respectively, may be pulled from the server, as updated videos.

Or, in addition to pulling the updated videos corresponding to all the followed users in the followed user list at one time, updated videos of only some of the followed users may be first pulled, for example, pulling updated videos of 3 followed users at a time, and when an update condition of followed user is satisfied, continue to pull the updated videos of the followed users in the followed user list whose updated video has not been pulled currently.

S120, generate a user-dimensional horizontal sliding list corresponding respectively to the at least one followed user according to the obtained updated video.

In the present embodiment, the user-dimensional horizontal sliding list may be a corresponding horizontal sliding list generated per followed user, respectively, and different horizontal sliding lists may correspond to different followed users, and a preset number of obtained updated videos corresponding to a followed user may be displayed in the horizontal sliding list corresponding to the followed user. When a user is browsing, updated videos recently uploaded by the followed user may be browsed by performing a horizontal sliding operation on the horizontal sliding list corresponding to the followed user.

From the dimension of the followed user, the effect of generating the user-dimensional horizontal sliding list corresponding to the followed user is that, when the updated videos of a plurality of followed users are browsed, the updated videos can be selectively watched according to the followed users, which is convenient for a user to directly capture a point of interest. Even if there are a large number of followed users or there are many videos currently updated, the updated video corresponding to a target followed user may be found in time, which enhances video display efficiency and improves user watching experience.

Optionally, the generating a user-dimensional horizontal sliding list corresponding respectively to the at least one followed user according to the obtained updated video, includes: grouping the obtained updated videos according to different followed users to obtain different updated video groups corresponding to different followed users; establishing a first horizontal sliding list corresponding to each updated video group, where the first horizontal sliding list includes a preset number of horizontal video filling positions; filling the horizontal video filling positions of the first horizontal sliding list corresponding to each updated video group with the updated video in each updated video group according to an upload time in an order of near-to-far from a current system time, respectively, to generate the user-dimensional horizontal sliding list corresponding respectively to the at least one followed user.

Figure 1B:
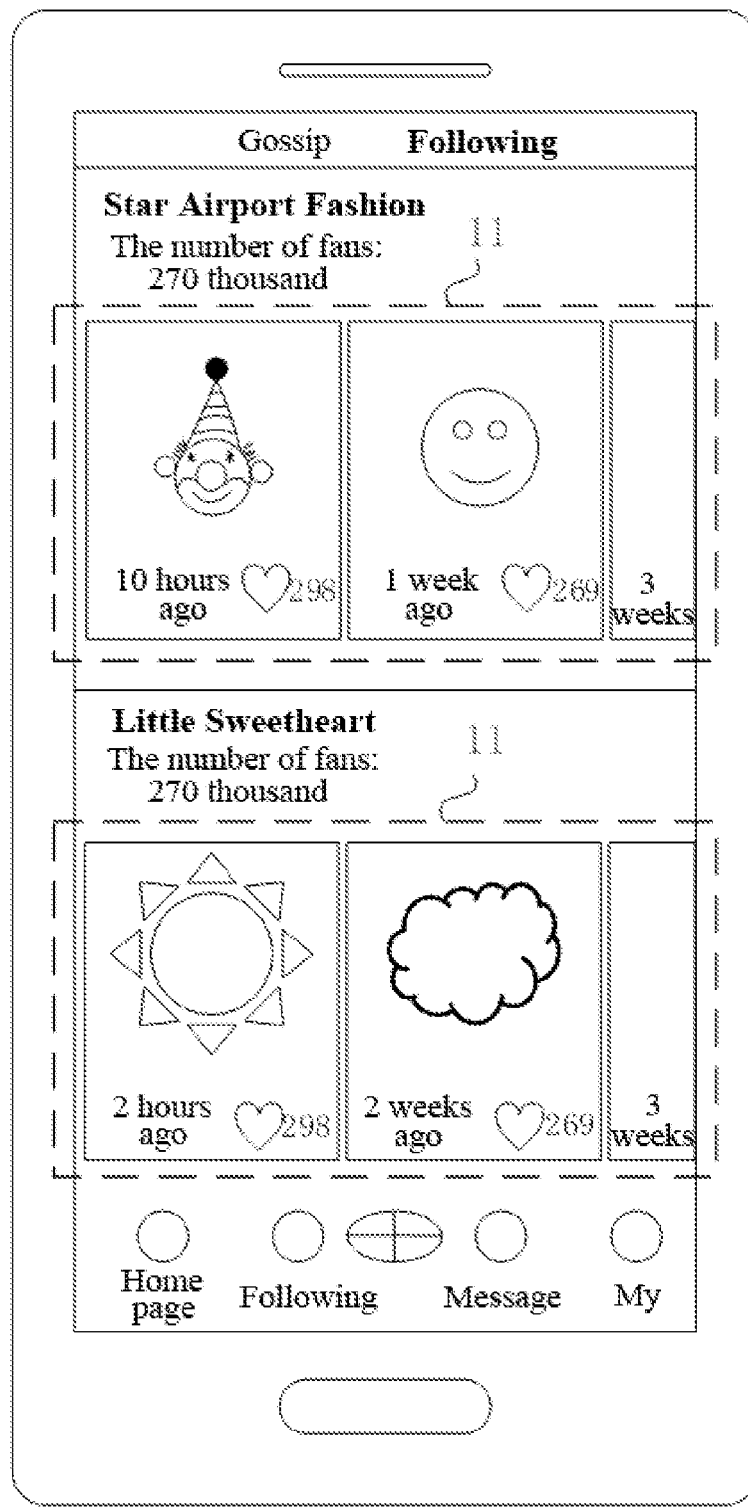
FIG. 1B is a schematic diagram of a display interface of a first horizontal sliding list according to Embodiment 1 of the present disclosure.

Illustratively, different followed users may correspond to different updated video groups, and at the same time, may correspond to different first horizontal sliding lists. Since the updated videos in each updated video group are updated videos recently uploaded by a corresponding followed user, the obtained updated videos may be filled into a plurality of horizontal video filling positions of the first horizontal sliding list corresponding to the followed user according to the corresponding followed user. At the same time, the update time of the updated video may be marked below each horizontal video filling position for users to select and view. For example, as shown in FIG. 1B, the followed user "Star Airport Fashion" and the followed user "Little Sweetheart" respectively correspond to a first horizontal sliding list 11, in which a preset number (for example, 8) of video filling positions are set, each of the video filling positions is respectively filled with an updated video uploaded recently by the corresponding followed user, and is arranged according to the upload time in an order of near-to-far from the current system time, thereby generating the user-dimensional horizontal sliding lists corresponding to a plurality of followed users. A user may perform video selection and browsing by sliding the user-dimensional horizontal sliding list horizontally.

S130, display the user-dimensional horizontal sliding list in a followed user information display interface.

In the present embodiment, the followed user information display interface may be an interface presented on the client after the user clicking a "Followed" tab on the screen, and the interface may be used to display information such as related videos of followed users. As shown in FIG. 1B, when user-dimensional horizontal sliding lists are generated, they can be displayed in the followed user information display interface in a one-to-one correspondence with the followed users, to facilitate users finding and watching updated videos uploaded by the followed users.

Optionally, displaying the user-dimensional horizontal sliding list in a followed user information display interface, includes: obtaining a first importance level weight of each followed user of at least two followed users; sorting user-dimensional horizontal sliding lists corresponding to the at least two followed users according to the first importance level weight of each followed user; displaying the user-dimensional horizontal sliding lists corresponding respectively to the at least two followed users in the followed user information display interface according to a sorting result of the user-dimensional horizontal sliding lists corresponding respectively to the at least two followed users.

In an embodiment, the first importance level weight may be a number of clicks on videos of each followed user by the client user, or the upload time of the updated video recently updated by each followed user, or may be the number of followers of each followed user (or the popularity of the followed user), etc., which is not limited herein. Illustratively, the user-dimensional horizontal sliding lists corresponding to at least two followed users may be sorted according to the first importance level weight, and then displayed in the followed user information display interface. For example, if the number of clicks by the client user to watch the videos of the followed user A is greater than the number of clicks by the client user to watch the videos of the followed user B, it means that the client user is more interested in the videos uploaded by the followed user A, and therefore, the first horizontal sliding list corresponding to the followed user A is arranged and displayed before the first horizontal sliding list corresponding to the followed user B, to facilitate the client user's finding and watching. For another example, if the number of followers of the followed user A is greater than the number of followers of the followed user B, it means that the popularity of the followed user A is greater than the followed user B, and the client user may be more interested in followed user A, and therefore, the user-dimensional horizontal sliding list corresponding to the followed user A is arranged and displayed before the user-dimensional horizontal sliding list corresponding to the followed user B, to facilitate the client user's choosing and watching.

In the technical solution of the present embodiment, by obtaining an updated video corresponding to at least one followed user in a followed user list, generating a user-dimensional horizontal sliding list corresponding respectively to the at least one followed user according to the obtained updated video, and displaying the user-dimensional horizontal sliding list in a followed user information display interface, the user-dimensional horizontal sliding list is established for each followed user to arrange and display users' corresponding updated videos according to the users, which solves the problem of lower video display efficiency and poor user watching experience in related technologies cause by displaying the updated videos of all the followed users mixed together, and achieves an effect of enhancing the video display efficiency and improving user watching experience.

On the basis of the above-mentioned embodiment, optionally, the following steps are further included: pulling at least one piece of real-time promotion information from the server, and configuring the at least one piece of real-time promotion information in a carousel diagram; accordingly, in a case of displaying the user-dimensional horizontal sliding list in the followed user information display interface, the following is further included: displaying the configured carousel diagram in the followed user information display interface.

Figure 1C:
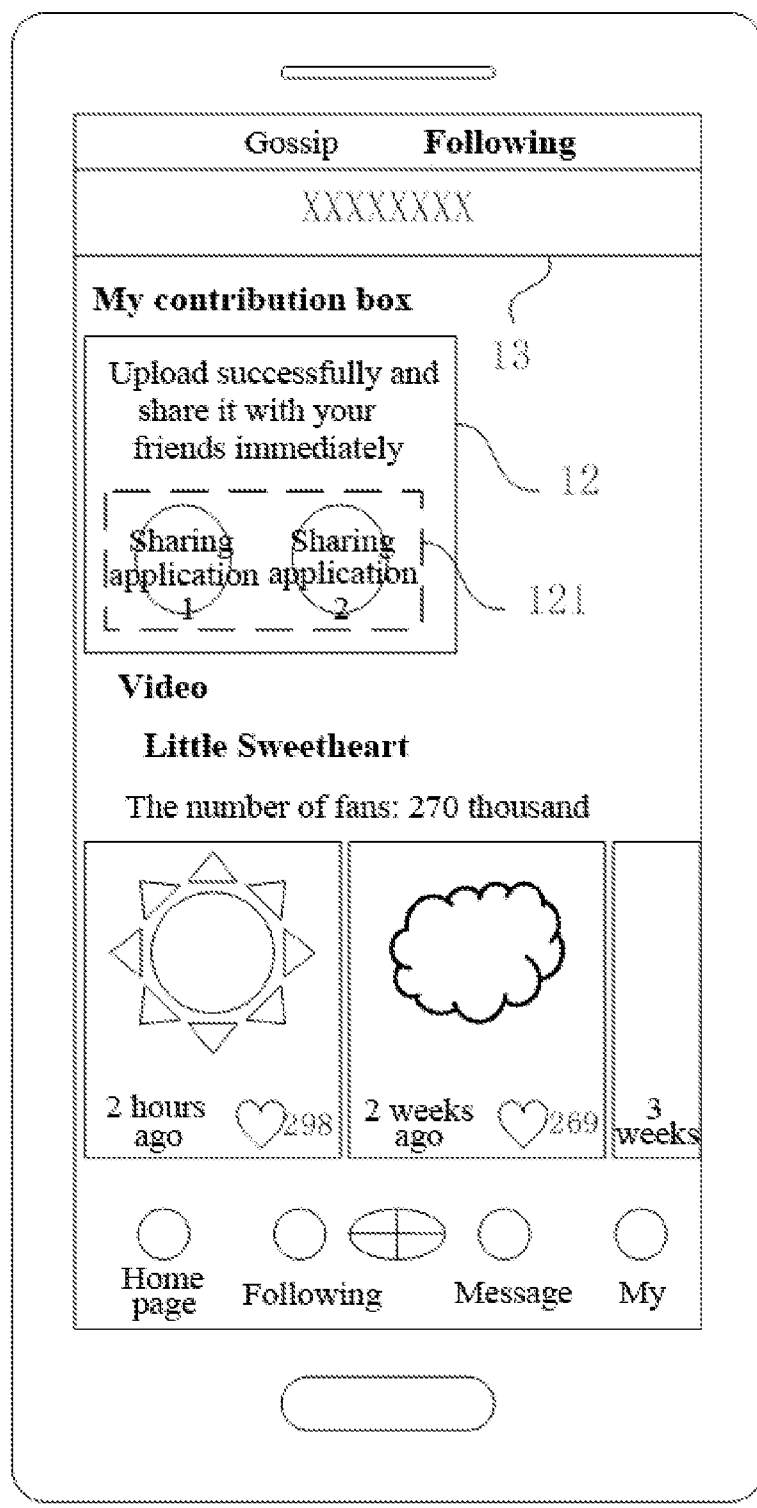
FIG. 1c is a schematic diagram of a display interface of an outbox control and a sharing control according to Embodiment 1 of the present disclosure.

Illustratively, in order to enhance publicity of promotion information by a small video application client, a carousel diagram 13 as shown in FIG. 1c may be set in a set area of the followed user information display interface to play one or more pieces of real-time promotion information, which are obtained from the server, in turn according to a preset cycle, where the set area may be a top portion of the user information display interface.

Optionally, in a case of displaying the user-dimensional horizontal sliding list in the followed user information display interface, the following is further included: displaying an outbox control in the followed user information display interface; where the outbox control is configured to provide a fast entry for shooting a real-time video and upload the real-time video to the server.

For example, as shown in FIG. 1c, an outbox control 12 may be set in the followed user information display interface, and a user may quickly shoot a real-time video by clicking the outbox control and upload it to the server. The advantage of setting the outbox control is that, after watching the updated video of interest, the user may click the outbox control set in the same interface to improvisationally shoot and upload the user's own small video, which improves user experience.

Optionally, in a case of displaying the outbox control in the followed user information display interface, the following is further included: displaying a sharing control in the followed user information display interface; where the sharing control is configured to provide a fast entry for sharing the shot real-time video.

On the basis of the above-mentioned implementations of the present embodiment, optionally, as shown in FIG. 1c, a sharing control 121 may be set on the outbox control, so that the user can share a video with users on other third party platforms for watching after shooting and uploading the video in real time.

Embodiment 2

Figure 2A:
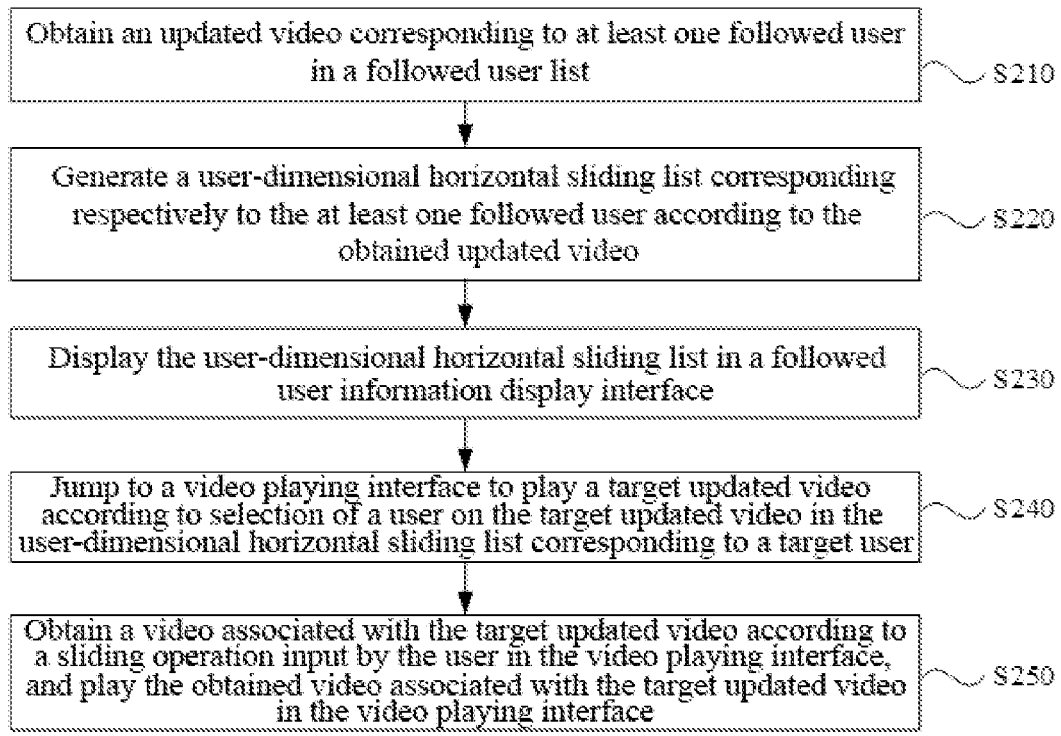
FIG. 2a is a schematic flow diagram of a method for displaying followed user information according to Embodiment 2 of the present disclosure.

FIG. 2a is a schematic flow diagram of a method for displaying followed user information according to Embodiment 2 of the present disclosure. The present embodiment is illustrated on the basis of the optional solutions in the above-mentioned embodiment, and provides an optional method for displaying followed user information, which, after displaying the user-dimensional horizontal sliding list on the followed user information display interface, further includes: jumping to a video playing interface to play a target updated video according to selection of a user on the target updated video in the user-dimensional horizontal sliding list corresponding to a target user; obtaining a video associated with the target updated video according to a sliding operation input by the user in the video playing interface, and playing the obtained video associated with the target updated video in the video play interface. The following steps are included:

S210, obtain an updated video corresponding to at least one followed user in a followed user list.

S220, generate a user-dimensional horizontal sliding list corresponding respectively to the at least one followed user according to the obtained updated video.

S230, display the user-dimensional horizontal sliding list in a followed user information display interface.

S240, jump to a video playing interface to play a target updated video according to selection of a user on the target updated video in the user-dimensional horizontal sliding list corresponding to a target user.

In the present embodiment, the updated video may be played according to the user's selection. In an embodiment, a video playing interface may be separately set, and the updated video selected by the user is played in full screen. Illustratively, if a client user clicks on an updated video in the user-dimensional horizontal sliding list corresponding to the followed user A, then jumping may be performed from a current followed user information display interface to the video playing interface to play the updated video in full screen, facilitating the user watching video content.

Optionally, after jumping to the video playing interface to play the target updated video according to the selection of the user on the target updated video in the user-dimensional horizontal sliding list corresponding to the target user, the following is further included: adding a plurality of videos in a target user-dimensional horizontal sliding list to a preview window; displaying the preview window inside the video playing interface, so that the user previews the videos except for the target updated video in the target user dimensional horizontal sliding list through the preview window.

After jumping to the video playing interface, in order to facilitate the user selecting other updated videos to play, a preview window may be set inside the video playing interface, and a plurality of videos in the user-dimensional horizontal sliding list corresponding to the target user may be added to the preview window, to facilitate the user previewing other updated videos in the list through the preview window, and at the same time, the user may click other updated videos in the preview window to jump from the video currently played in the video playing interface to another updated video clicked by the user.

Optionally, the preview window includes a sliding preview window; where the sliding preview window is configured to display a preset number of videos in the user-dimensional horizontal sliding list corresponding to the target user in real time, and the video initially presented in the sliding preview window is associated with the video initially played in the video playing interface.

Figure 2B:
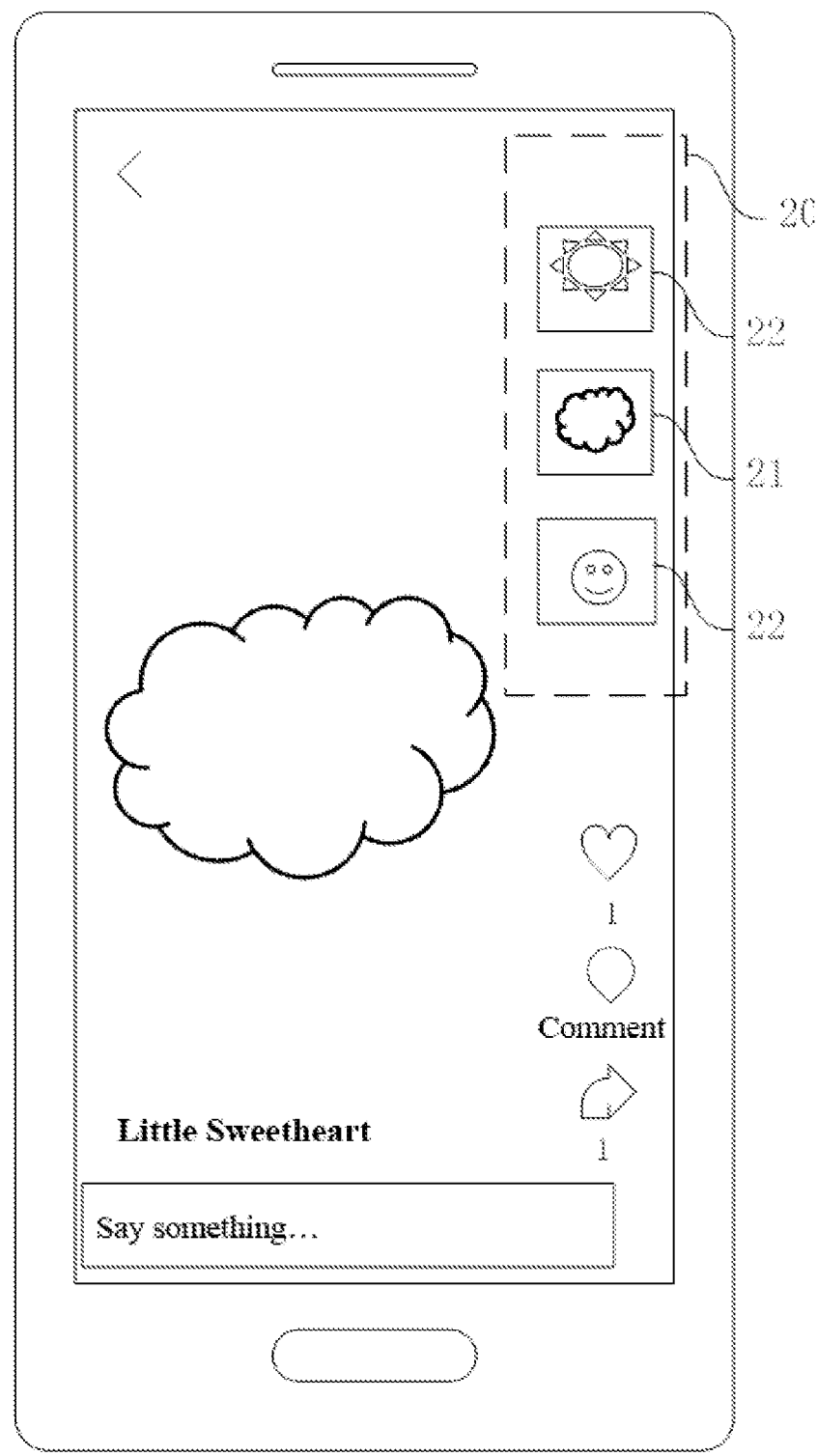
FIG. 2b is a schematic diagram of a display interface of a preview window according to Embodiment 2 of the present disclosure.

As shown in FIG. 2b, in a practical example, the preview window is a longitudinally arranged sliding preview window 20, in which a maximum of three videos may be presented at one time, and the user may preview a plurality of updated videos in the user-dimensional horizontal sliding list corresponding to the target user by sliding the sliding preview window 20. In an embodiment, in an initial state, the video initially presented in the sliding preview window 20 may be, a target updated video 21 initially played in the video playing interface, and adjacent one or two nearby updated videos 22 in the user-dimensional horizontal sliding list corresponding to the target user. In order to facilitate the user distinguishing, the corresponding target updated video 21 in the sliding preview window 20 can be display highlighted according to the target updated video currently played in the video playing interface.

S250, obtain a video associated with the target updated video according to a sliding operation input by the user in the video playing interface, and play the obtained video associated with the target updated video in the video playing interface.

In the present embodiment, the sliding operation input by the user in the video playing interface may be an upward sliding operation, or may be a downward sliding operation. Other videos associated with the target updated video may be updated videos adjacent to the target updated video in the user-dimensional horizontal sliding list corresponding to the target user. For example, when the sliding operation input by the user in the video playing interface is the upward sliding operation, then a next updated video of the target updated video in the user-dimensional horizontal sliding list corresponding to the target user may be obtained to play the next updated video; when the sliding operation input by the user in the video playing interface is the downward sliding operation, a previous updated video of the target updated video in the user-dimensional horizontal sliding list corresponding to the target user may be obtained to play the previous updated video.

In the technical solution of the present embodiment, on the basis of the above-mentioned embodiment, the video playing interface is jumped to, to play the target updated video according to the selection of the user on the target updated video in the user-dimensional horizontal sliding list corresponding to the target user, a video associated with the target updated video is obtained according to the sliding operation input by the user in the video playing interface, and the obtained video associated with the target updated video is displayed in the video playing interface, so that the user can quickly find an updated video of interest, and directly play the updated video, and at the same time, can select other updated videos to play through a simple sliding operation without exiting the current video play, which facilitates the user's selection and improves the user's watching experience.

Embodiment 3

Figure 3:
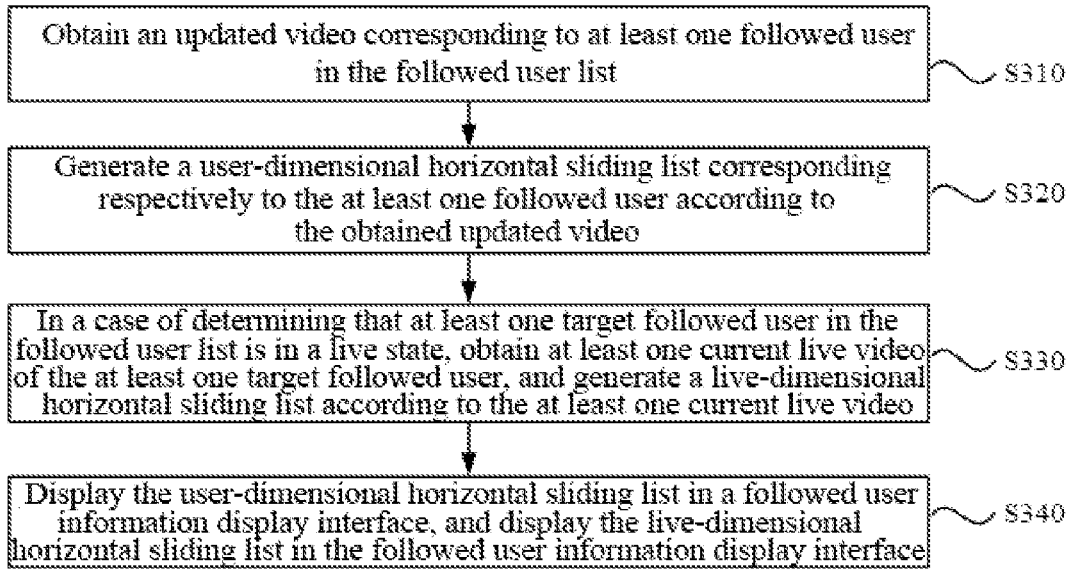
FIG. 3 is a schematic flow diagram of a method for displaying followed user information according to Embodiment 3 of the present disclosure.

FIG. 3 is a schematic flow diagram of a method for displaying followed user information according to Embodiment 3 of the present disclosure. The present embodiment is illustrated on the basis of the optional solutions in the above-mentioned embodiments, and provides an optional method for displaying followed user information, which further includes: in a case of determining that at least one target followed user in the followed user list is in a live state, obtaining at least one current live video of the at least one target followed user, and generating a live-dimensional horizontal sliding list according to the at least one current live video; and in a case of displaying the user-dimensional horizontal sliding list in the followed user information display interface, the following is further included: displaying the live-dimensional horizontal sliding list in the followed user information display interface. The following steps are included:

S310, obtain an updated video corresponding to at least one followed user in a followed user list.

S320, generate a user-dimensional horizontal sliding list corresponding to the at least one followed user according to the obtained updated video respectively.

S330, in a case of determining that at least one target followed user in the followed user list is in a live state, obtain at least one current live video of the at least one target followed user, and generate a live-dimensional horizontal sliding list according to the at least one current live video.

In the present embodiment, in addition to the updated video, target followed users may live currently, that is, in a live state. At this time, the current live video of all target followed users who are in the live state may also be displayed accordingly. Illustratively, the same manner as the generation of the user-dimensional horizontal sliding list in the first embodiment may be used to generate the corresponding live-dimensional horizontal sliding list according to the current live videos of all target followed users in the live state in the followed user list, where all the live videos of the followed users may correspond to a live-dimensional horizontal sliding list. When a user is browsing, the user may perform a horizontal sliding operation on the live-dimensional horizontal sliding list to browse the current live videos of all the target followed users who are in the live state.

Optionally, obtaining a current live video of the target followed user, and generating a live-dimensional horizontal sliding list according to the at least one current live video, includes: establishing a second horizontal sliding list, where the second horizontal sliding list includes a preset number of horizontal video filling positions; sorting at least one current live video according to a second importance level weight of each target followed user and/or a second importance level weight of each current live video; filling the horizontal video filling positions of the second horizontal sliding list with the at least one current live video according to a sorting result of the at least one current live video, and generating the live-dimensional horizontal sliding list.

In an embodiment, the second importance level weight may be a number of clicks on videos of each followed user by the client user, or may be a number of followers of each followed user (or the popularity of the followed user), or may be a number of audience who are watching the live in the current live video of each followed user, which is not limited herein.

In a practical example, the followed user A and followed user B are in the live state, therefore, a second horizontal sliding list can be generated accordingly, and a preset number (for example, 8) of video filling positions are set in the second horizontal sliding list. If a popularity of the followed user A is greater than a popularity of the followed user B, then the current live video of the followed user A may be arranged before the current live video of the followed user B, and a first video filling position and a second video filling position of the second horizontal sliding list are filed with the current live video of the followed user A and the current live video of the followed user B, thereby a live-dimensional horizontal sliding list is generated, and the user may perform video selection and browsing by sliding the live-dimensional horizontal sliding list horizontally. In addition, if the number of target followed users in the live state is not greater than the preset number of video filling positions, only the filled video filling positions may be displayed, and other empty video filling positions may be hidden; if the number of target followed users in the live state is greater than the preset number of video filling positions, then the preset number of current live videos arranged at the top may be displayed for display.

In the present embodiment, for the execution order of the steps, for example, the execution of S330 may not be necessarily after S320, but may also be arranged before S340 and before or after other steps, which is not limited herein.

S340, display the user-dimensional horizontal sliding list in a followed user information display interface, and display the live-dimensional horizontal sliding list in the followed user information display interface.

In the present embodiment, while the user-dimensional horizontal sliding list is displayed in the followed user information display interface, the live-dimensional horizontal sliding list may also be displayed in the followed user information display interface, so as to enrich the following dimensions of users on the followed users and improve user watching experience. After the live-dimensional horizontal sliding list is generated, it may be correspondingly displayed in a live option bar of the followed user information display interface, so that the user may choose to watch the current live video of a target followed user in the live state.

In the technical solution of the present embodiment, on the basis of the above-mentioned embodiments, in a case of determining that at least one target followed user in the followed user list is in the live state, the current live video of all target followed users are obtained, and a live-dimensional horizontal sliding list is generated and displayed in the followed user information display interface, and thus the current live video is also followed besides the updated video, thereby enriching the following dimensions of users to the followed users and improving user watching experience.

Embodiment 4

Figure 4:
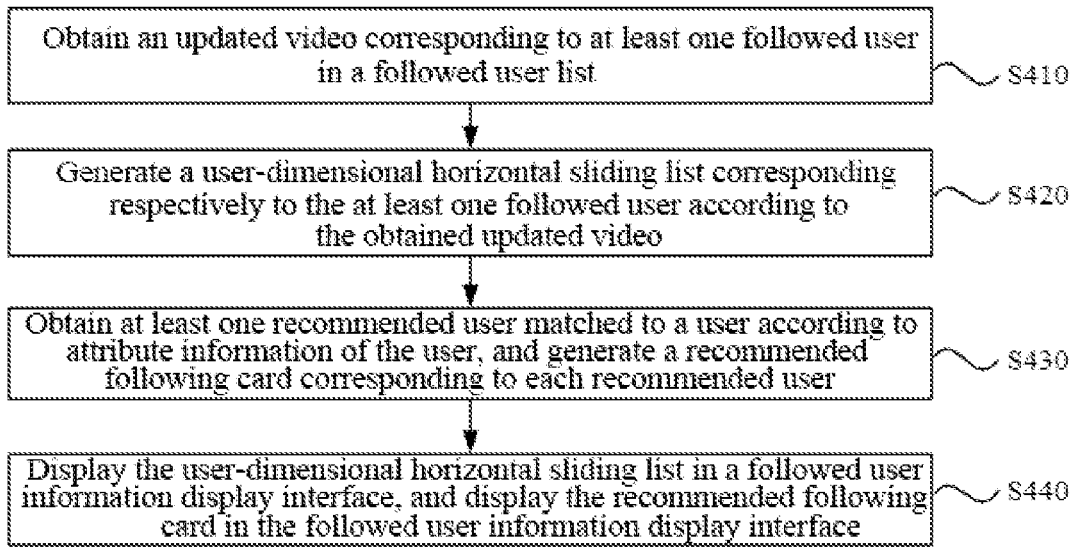
FIG. 4 is a schematic flow diagram of a method for displaying followed user information according to Embodiment 4 of the present disclosure.

FIG. 4 is a schematic flow diagram of a method for displaying followed user information according to Embodiment 4 of the present disclosure. The present embodiment is illustrated on the basis of the optional solutions in the above-mentioned embodiments, and provides an optional method for displaying followed user information, which further includes: obtaining at least one recommended user matched to a user according to attribute information of the user, and generating a corresponding recommended following card for each recommended user; in a case of displaying the user-dimensional horizontal sliding list in the followed user information display interface, further including: displaying the recommended following card corresponding to the at least one recommended user in the followed user information display interface. The following steps are included:

S410, obtain an updated video corresponding to at least one followed user in a followed user list.

S420, generate a user-dimensional horizontal sliding list corresponding respectively to the at least one followed user according to the obtained updated video.

S430, obtain at least one recommended user matched to a user according to attribute information of the user, and generate a recommended following card corresponding to each recommended user.

On the basis of the above-mentioned embodiments, the present embodiment further adds a recommendation function, that is, obtaining at least one matched recommended user from the server through the attribute information of the user, and at the same time, generating the recommended following card corresponding to each recommended user, and showing the recommended following card to the client user, where the attribute information of the user may be a user behavior tag, a user historical following record, and the like.

In an embodiment, content displayed in the recommended following card may be one or more popular videos of a target recommended user, and the client user may click the recommended following card to watch the popular video of the target recommended user, so that the server has the ability to control, and can recommend to a user the followed user who the user may like at any time, which greatly increases the generation of following behaviors.

In addition, it should be emphasized that, for the execution order of the steps in the present embodiment, for example, the execution of S430 may not be necessarily after S420, but may also be arranged before S440 and before or after other steps, which is not limited herein.

S440, display the user-dimensional horizontal sliding list in a followed user information display interface, and display the recommended following card in the followed user information display interface.

In the present embodiment, while the user-dimensional horizontal sliding list is displayed in the followed user information display interface, recommended following cards may also be displayed in sequence in the followed user information display interface to recommend videos that a user may be interested in to the user. After the recommended following card corresponding to the client user is generated, it may be correspondingly displayed in the followed user information display interface, facilitating the user choosing and watching videos of other users, improving the generation of the user's following behavior.

Optionally, displaying the recommended following card corresponding to the at least one recommended user in the followed user information display interface, includes: sorting the at least one recommended user according to a third importance level weight of each recommended user; displaying the recommended following card corresponding to the at least one recommended user in the followed user information display interface according to a sorting result of the at least one recommended user.

In an embodiment, the third importance level weight may be a number of followers of each recommended user (or the popularity of the recommended user), or a matching degree between the user's attribute information and each recommended user, or may be a recommendation level preset by a platform after evaluating each recommended user, etc., which is not limited herein.

In a practical example, for a recommended user C and a recommended user D, recommendation following cards are generated respectively. If the behavior tag of the client user is "dance" and the behavior tag of the recommended user C is "dance", and the behavior tag of the recommended user D is "sing", it is indicated that the recommended user C matches the client user better. Therefore, the recommended following card corresponding to the recommended user C may be arranged and displayed before the recommended following card corresponding to the recommended user D, and displayed in the followed user information display interface to recommend followed users who the user may like to the user, which improves user experience.

In the technical solution of the present embodiment, on the basis of the above-mentioned embodiments, at least one matched recommended user is obtained according to the attribute information of the user, and the recommended following card corresponding to each recommended user is generated, and the user-dimensional sliding list is displayed in the followed user information display interface, and at the same time, the recommended following card is also displayed in the followed user information display interface, so that followed users that a user may like can be recommended to the user at any time, which greatly increases the generation of following behaviors, thereby improving users' use experience.

On the basis of the above-mentioned embodiments, optionally, one type of display item in the followed user information display interface is implemented by a section controller, and one section controller is managed by a collection class view controller, and all collection class view controllers are managed by a view controller.

In the present embodiment, encapsulation of each type of display item may be implemented through a section controller (sectionController), and the encapsulated sectionController may be directly called when the same type of display item is used next time. The display items include, but are not limited to, the user-dimensional horizontal sliding list, the live-dimensional horizontal sliding list, and the like mentioned in the implementation in the above-mentioned embodiments. A sectionController may perform delivery linkage management by a collection class view controller (UICollectionViewController), such as responses to click events and sliding events. All UICollectionViewControllers may be managed by a view controller (ViewController).

To give a practical example, the implementation of the click and scroll carousel of the carousel diagram itself are completed by the carousel diagram itself, and the carousel diagram makes responses and performs jumps, and links are configurable. And the user-dimensional horizontal sliding list is used as a sectionController, each updated video therein may still be used as a sectionController to control itself alone, and a linkage of the sectionController is realized by a defined interface, which greatly decouples service logic, and has higher scalability compared with a traditional form of writing code in a view controller (ViewController). Since each sectionController can support a specific capability, its reusability is greatly improved.

Embodiment 5

Figure 5:
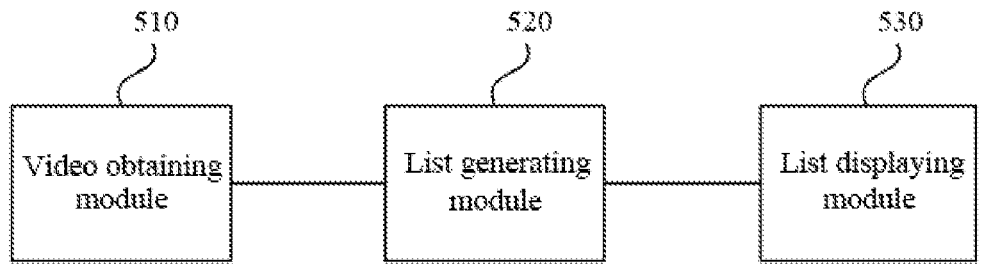
FIG. 5 is a schematic flow diagram of an apparatus for displaying of followed user information according to Embodiment 5 of the present disclosure.

FIG. 5 is a schematic flow diagram of an apparatus for displaying followed user information according to Embodiment 5 of the present disclosure. Refer to FIG. 5, the apparatus for displaying followed user information includes: a video obtaining module 510, a list generating module 520, and a list displaying module 530. Each module will be described below.

The video obtaining module 510 is configured to obtain an updated video corresponding to at least one followed user in a followed user list.

The list generating module 520 is configured to generate a user-dimensional horizontal sliding list corresponding to the at least one followed user according to the obtained updated video.

The list displaying module 530 is configured to display the user-dimensional horizontal sliding list in the followed user information display interface.

The apparatus for displaying followed user information provided by the embodiment, obtains an updated video corresponding to at least one followed user in the followed user list, generates a user-dimensional horizontal sliding list corresponding respectively to the at least one followed user according to the obtained updated video, and displays the user-dimensional horizontal sliding list in a followed user information display interface, and thus the user-dimensional horizontal sliding list is established for each followed user, to arrange and display users' corresponding updated videos according to the users, which solves the problem of low video display efficiency and poor user watching experience in related technologies caused by displaying updated videos of all the followed users mixed together, and achieves an effect of enhancing video display efficiency and improving user watching experience.

Optionally, the video obtaining module 510 is configured to:
pull, from a server, according to an upload time in an order of near-to-far from a current system time, a preset number of videos corresponding to the at least one followed user in the followed user list as updated videos.

Optionally, the list generating module 520 is configured to:
group the obtained updated videos according to different followed users to obtain different updated video groups corresponding to different followed users;
establish a first horizontal sliding list corresponding to each updated video group, where the first horizontal sliding list includes a preset number of horizontal video filling positions;
fill the horizontal video filling positions of the first horizontal sliding list corresponding to each updated video group with the updated video in each updated video group, respectively, according to an upload time in an order of near-to-far from a current system time, to generate the user-dimensional horizontal sliding list corresponding to the at least one followed user.

Optionally, the apparatus may further include:
a video jumping module, configured to, after the user-dimensional horizontal sliding list is displayed in the followed user information display interface, jump, according to selection of a user on a target updated video in the user-dimensional horizontal sliding list corresponding to a target user, to a video playing interface to play the target updated video;
a video playing module, configured to obtain a video associated with the target updated video according to a sliding operation input by the user in the video playing interface, and play the obtained video associated with the target updated video in the video play interface.

Optionally, the apparatus may further include:
a video adding module, configured to, after the video playing interface is jumped to according to the selection of the user on the target updated video in the user-dimensional horizontal sliding list corresponding to the target user to play the target updated video, add a plurality of videos in the user-dimensional horizontal sliding list corresponding to the target user to a preview window;
a window displaying module, configured to display the preview window inside the video playing interface, so that the user previews videos, except for the target updated video, in the user dimensional horizontal sliding list corresponding to the target user, through the preview window.

Optionally, the preview window may include a sliding preview window;
where the sliding preview window is configured to display a preset number of videos in the user-dimensional horizontal sliding list corresponding to the target user in real time, and a video initially presented in the sliding preview window is associated with a video initially played in the video playing interface.

Optionally, the list displaying module 530 is configured to:
obtain a first importance level weight of each followed user of at least two followed users;
sort user-dimensional horizontal sliding lists corresponding to the at least two followed users according to the first importance level weight of each followed user;
display the user-dimensional horizontal sliding lists corresponding respectively to the at least two followed users in the followed user information display interface according to a sorting result of the user-dimensional horizontal sliding lists corresponding respectively to the at least two followed users.

Optionally, the apparatus may further include:
a live generating module, configured to, in a case of determining that at least one target followed user in the followed user list is in a live state, obtain at least one current live video of the at least one target followed user, and generate a live-dimensional horizontal sliding list according to the at least one current live video;

The device apparatus may further include:
a live displaying module, configured to display the live-dimensional horizontal sliding list in the followed user information display interface in a case that the user-dimensional horizontal sliding list is displayed in the followed user information display interface.

Optionally, the live generating module is configured to:
establish a second horizontal sliding list, where the second horizontal sliding list includes a preset number of horizontal video filling positions;
sort the at least one current live video according to a second importance level weight of each target followed user and/or a second importance level weight of each current live video;
fill the horizontal video filling positions of the second horizontal sliding list with the at least one current live video according to a sorting result of the at least one current live video, and generate the live-dimensional horizontal sliding list.

Optionally, the apparatus may further include:
an information configuring module, configured to pull at least one piece of real-time promotion information from a server, and configure the at least one piece of real-time promotion information in a carousel diagram;

The apparatus may further include:
a carousel diagram displaying module, configured to display the configured carousel diagram in the followed user information display interface, in a case that the user-dimensional horizontal sliding list is displayed in the followed user information display interface.

Optionally, the apparatus may further include:
an outbox displaying module, configured to display an outbox control in the followed user information display interface, in a case that the user-dimensional horizontal sliding list is displayed in the followed user information display interface; where the outbox control is configured to provide a fast entry for shooting a real-time video and uploading the real-time video to a server.

Optionally, the apparatus may further include:
a sharing and displaying module, configured to display a sharing control in the followed user information display interface, in a case that the outbox control is displayed in the followed user information display interface; where the sharing control is configured to provide a fast entry for sharing the shot real-time video.

Optionally, the apparatus may further include:
a card generating module, configured to obtain at least one recommended user matched to a user according to attribute information of the user, and generate a recommended following card corresponding to each recommended user;

The apparatus may further include:
a card displaying module, configured to display the recommended following card corresponding to the at least one recommended user in the followed user information display interface, in a case that the user-dimensional horizontal sliding list is displayed in the followed user information display interface.

Optionally, the card displaying module is configured to:
sort the at least one recommended user according to a third importance level weight of each recommended user;
display the recommended following card corresponding to the at least one recommended user in the followed user information display interface according to a sorting result of the at least one recommended user.

Optionally, one type of display item in the followed user information display interface is implemented by a section controller, and one section controller is managed by a collection class view controller, and all collection class view controllers are managed by a view controller.

The above-mentioned product may execute the method provided by any embodiments of the present disclosure, and has functional modules and effects corresponding to the execution method.

Embodiment 6

Figure 6:
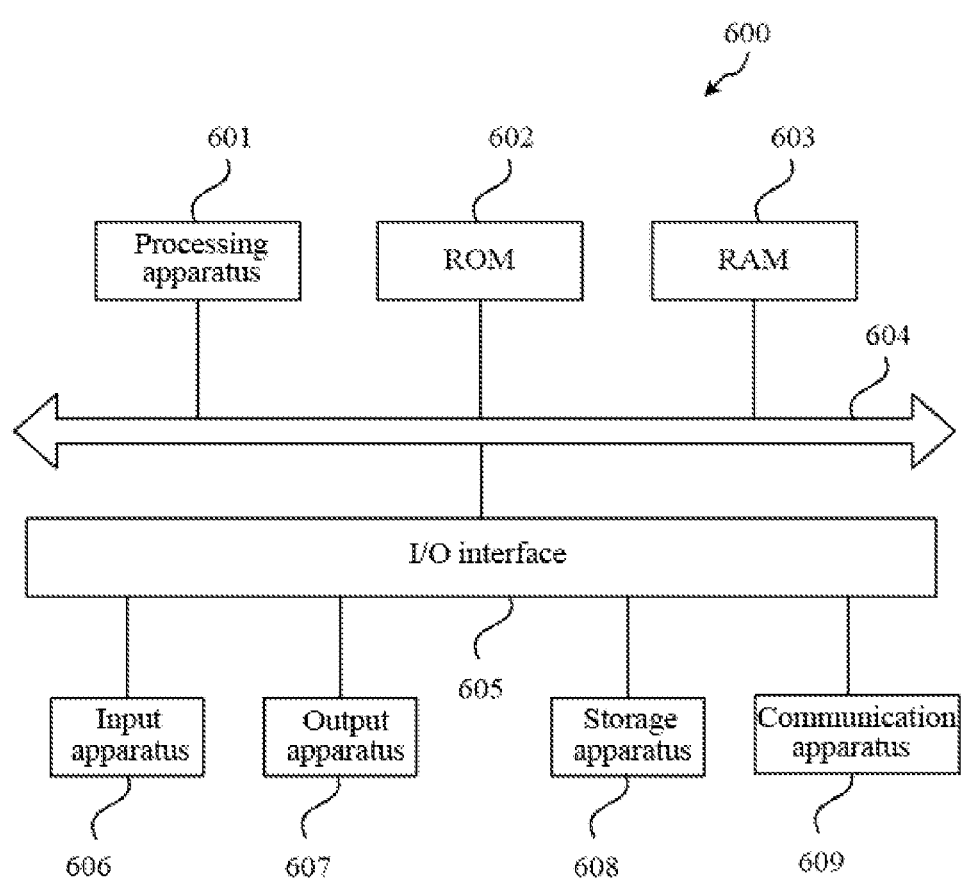
FIG. 6 is a schematic diagram of a hardware structure of a terminal device according to Embodiment 6 of the present disclosure.

Refer to FIG. 6, which shows a schematic structural diagram of a terminal device 600 suitable for implementing embodiments of the present disclosure. The terminal device in the embodiment of the present disclosure may include, but is not limited to, a mobile terminal, such as a mobile phone, a notebook computer, a digital broadcast receiver, a personal digital assistant (Personal Digital Assistant, PDA), a tablet computer, a portable multimedia player (Portable Media Player, PMP), an in-vehicle terminal (for example, an in-vehicle navigation terminal), and a fixed terminal, such as a digital television (Television, TV), a desktop computer. The terminal device shown in FIG. 6 is only an example, and should not be considered as any limitation to the function and scope of use of the embodiments of the present disclosure.

As shown in FIG. 6, the terminal device 600 may include a processing apparatus (such as a central processor, a graphics processor, etc.) 601, which may perform various appropriate actions and processing according to a program stored in a read-only memory (Read-Only Memory, ROM) 602 or a program loaded from a storage apparatus 608 to a random access memory (Random Access Memory, RAM) 603. In the RAM 603, various programs and data required for the operation of the terminal device 600 are also stored. The processing apparatus 601, the ROM 602, and the RAM 603 are connected to each other through a bus 604. An input/output (Input/Output, I/O) interface 605 is also connected to the bus 604.

Generally, the following apparatuses may connect to the I/O interface 605: an input apparatus, 606 including for example a touch screen, a touch panel, a keyboard, a mouse, a camera, a microphone, a accelerometer, a gyroscope, and the like; an output apparatus 607, including for example a liquid crystal display (Liquid Crystal Display, LCD), a speaker, a vibrator, and the like; a storage apparatus 608, including for example a magnetic tape, a hard disk, and the like; and a communication apparatus 609. The communication apparatus 609 may allow the terminal device 600 to perform wireless or wire communication with other devices to exchange data. Although FIG. 6 shows the terminal device 600 with multiple kinds of apparatuses, it is not required to implement or have all the apparatuses shown in FIG. 6. It may alternatively be implemented or provided with more or fewer apparatuses.

According to an embodiment of the present disclosure, the process described above with reference to the flowchart may be implemented as a computer software program. For example, an embodiment of the present disclosure includes a computer program product, which includes a computer program carried on a computer readable medium, and the computer program contains program code for executing the method shown in the flowchart. In such an embodiment, the computer program may be downloaded and installed from the network through the communication apparatus 609, or installed from the storage apparatus 608, or installed from the ROM 602. When the computer program is executed by the processing apparatus 601, the above-mentioned functions defined in the method of the embodiment of the present disclosure are executed.

The above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semi-conductor system, apparatus or device, or any combination of the above. Examples of computer readable storage medium may include, but are not limited to: an electrical connection with one or more wires, a portable computer disk, a hard disk, a RAM, a ROM, an erasable programmable read-only memory (Erasable Programmable Read-Only Memory, EPROM or flash memory), an optical fiber, a compact disc read-only memory (Compact Disc Read-Only Memory, CD-ROM), an optical storage device, a magnetic storage device, or any suitable combination of the above. In the present disclosure, a computer readable storage medium may be any tangible medium that contains or stores a program, and the program may be used by or in combination with an instruction execution system, apparatus, or device. In the present disclosure, a computer readable signal medium may include a data signal propagated in a baseband or as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable media other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, a radio frequency (Radio Frequency, RF), etc., or any suitable combination of the above.

The above-mentioned computer readable medium may be included in the above-mentioned terminal device; or it may exist alone without being assembled into the terminal device.

The above-mentioned computer readable medium carries one or more programs, and when the above-mentioned one or more programs are executed by the terminal device, the terminal device is caused to: obtain an updated video corresponding to at least one followed user in a followed user list; generate a user-dimensional horizontal sliding list corresponding respectively to the at least one followed user according to the obtained updated video; display the user-dimensional horizontal sliding list in a followed user information display interface.

The computer program code used to perform operations of the present disclosure may be written in one or more programming languages or a combination thereof. The above-mentioned programming languages include object-oriented programming languages—such as Java, Smalltalk, C++, and also include conventional procedural programming language—such as "C" language or similar programming language. The program code may be executed entirely on 'a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (Local Area Network, LAN) or a wide area network (Wide Area Network, WAN), or, it may be connected to an external computer (for example, use an Internet service provider to connect via the Internet).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a specified logical function. It should also be noted that, in some alternative implementations, the functions marked in the blocks may also occur in a different order from the order marked in the drawings. For example, two blocks shown one after another may actually be executed substantially in parallel, or sometimes may be executed in the reverse order, which depends on the functions involved. It should also be noted that, each block in the block diagram and/or flowchart, and a combination of the blocks in the block diagram and/or flowchart, may be implemented by a dedicated hardware-based system that performs the specified functions or operations, or may be implemented by a combination of dedicated hardware and computer instructions.

The modules or units involved in the embodiments described in the present disclosure may be implemented in software or hardware. Where a name of the module or unit does not constitute a limitation on the module or unit itself in one case. For example, the video obtaining module may also be described as "a module configured to obtain an updated video corresponding to at least one followed user in a followed user list".

What is claimed is:

1. A method for displaying followed user information, comprising:
   obtaining updated videos corresponding to at least one followed user in a followed user list;
   generating, according to the obtained updated videos, a user-dimensional horizontal sliding list corresponding respectively to the at least one followed user; and
   displaying the user-dimensional horizontal sliding list in a followed user information display interface;
   wherein the obtaining updated videos corresponding to at least one followed user in a followed user list, comprises:
      pulling, according to a publishing time in an order of near-to-far from a current system time, a plurality of videos published correspondingly by all the followed user in the followed user list from a server as the updated videos, and
   wherein the generating, according to the obtained updated videos, a user-dimensional horizontal sliding list corresponding respectively to the at least one followed user, comprises:
      grouping the obtained updated videos according to different followed users to obtain different updated video groups corresponding to the different followed users;
      establishing a first horizontal sliding list corresponding to each updated video group, wherein the first horizontal sliding list comprises a preset number of horizontal video filling positions; and
      filling, according to a publishing time in an order of near-to-far from a current system time, the horizontal video filling positions of the first horizontal sliding list corresponding to each updated video group with an updated video in each updated video group, respectively, to generate the user-dimensional horizontal sliding list corresponding to the at least one followed user.

2. The method according to claim 1, wherein the displaying the user-dimensional horizontal sliding list in a followed user information display interface, comprises:
   jumping to a video playing interface to play a target updated video according to selection of a user on a target updated video in the user-dimensional horizontal sliding list corresponding to a target user; and
   obtaining a video associated with the target updated video according to a sliding operation input by the user in the video playing interface, and playing the obtained video associated with the target updated video in the video play interface.

3. The method according to claim 2, wherein the jumping to a video playing interface to play a target updated video according to selection of a user on a target updated video in the user-dimensional horizontal sliding list corresponding to a target user, further comprises:
   adding a plurality of videos in the user-dimensional horizontal sliding list corresponding to the target user to a preview window; and
   displaying the preview window inside the video playing interface, so that the user previews videos except for the target updated video in the target user dimensional horizontal sliding list through the preview window.

4. The method according to claim 3, wherein the preview window comprises a sliding preview window, and
   wherein the sliding preview window is configured to display a preset number of videos in the user-dimensional horizontal sliding list corresponding to the target user in real time, and a video initially presented in the sliding preview window is associated with a video initially played in the video playing interface.

5. The method according to claim 1, wherein the displaying the user-dimensional horizontal sliding list in a followed user information display interface, comprises:
   obtaining a first importance level weight of each followed user of at least two followed users;
   sorting user-dimensional horizontal sliding lists corresponding to the at least two followed users according to the first importance level weight of each followed user; and
   displaying the user-dimensional horizontal sliding list in the followed user information display interface correspondingly respectively to the at least two followed users according to a sorting result of the user-dimensional horizontal sliding lists corresponding respectively to the at least two followed users.

6. The method according to claim 5, wherein the first importance level weight includes one of: a number of clicks on videos of each followed user, the publishing time of the updated videos recently updated by each followed user, a number of followers of each followed user and popularity of the followed user.

7. The method according to claim 1, further comprising:
in a case of determining that at least one target followed user in the followed user list is in a live state, obtaining at least one current live video of the at least one target followed user, and generating a live-dimensional horizontal sliding list according to the at least one current live video; and
in a case of displaying the user-dimensional horizontal sliding list in the followed user information display interface, the method further comprises:
displaying the live-dimensional horizontal sliding list in the followed user information display interface.

8. The method according to claim 7, wherein the generating a live-dimensional horizontal sliding list according to the at least one current live video, comprises:
establishing a second horizontal sliding list, wherein the second horizontal sliding list comprises a preset number of horizontal video filling positions;
sorting at least one current live video according to at least one of a second importance level weight of each target followed user and a second importance level weight of each current live video; and
filling the horizontal video filling positions of the second horizontal sliding list with the at least one current live video according to a sorting result of the at least one current live video, and generating the live-dimensional horizontal sliding list.

9. The method according to claim 1, further comprising:
pulling at least one piece of real-time promotion information from a server, and configuring the at least one piece of real-time promotion information in a carousel diagram; and
in a case of displaying the user-dimensional horizontal sliding list in the followed user information display interface, the method further comprises:
displaying the configured carousel diagram in the followed user information display interface.

10. The method according to claim 1, wherein in a case of displaying the user-dimensional horizontal sliding list in the followed user information display interface, the method further comprises:
displaying an outbox control in the followed user information display interface; wherein the outbox control is configured to provide a fast entry for shooting a real-time video and uploading the real-time video to a server.

11. The method according to claim 10, wherein in a case of displaying the outbox control in the followed user information display interface, the method further comprises:
displaying a sharing control in the followed user information display interface; wherein the sharing control is configured to provide a fast entry for sharing the shot real-time video.

12. The method according to claim 1, further comprising:
obtaining at least one recommended user matched to a user according to attribute information of the user, and generating a recommended following card corresponding to each recommended user; and in a case of displaying the user-dimensional horizontal sliding list in the followed user information display interface, the method further comprises:
displaying the recommended following card corresponding to the at least one recommended user in the followed user information display interface.

13. The method according to claim 12, wherein the displaying the recommended following card corresponding to the at least one recommended user in the followed user information display interface, comprises:
sorting the at least one recommended user according to a third importance level weight of each recommended user; and
displaying the recommended following card corresponding to the at least one recommended user in the followed user information display interface according to a sorting result of the at least one recommended user.

14. The method according to claim 12, wherein the attribute information of the user includes at least one of a user behavior tag and a user historical following record.

15. The method according to claim 1, wherein,
one type of display item in the followed user information display interface is implemented by a section controller, and one section controller is managed by a collection class view controller, and all collection class view controllers are managed by a view controller.

16. An apparatus for displaying followed user information, comprising a processor and a memory, wherein the memory is configured to store a computer program, and the processor is configured to call and run the computer program stored in the memory and is configured to:
obtain updated videos corresponding to at least one followed user in a followed user list;
generate, according to the obtained updated videos, a user-dimensional horizontal sliding list corresponding respectively to the at least one followed user; and
display the user-dimensional horizontal sliding list in a followed user information display interface;
wherein the processor is further configured to:
pull, according to a publishing time in an order of near-to-far from a current system time, a plurality of videos published correspondingly by all the followed user in the followed user list from a server as the updated videos;
group the obtained updated videos according to different followed users to obtain different updated video groups corresponding to the different followed users;
establish a first horizontal sliding list corresponding to each updated video group, wherein the first horizontal sliding list comprises a preset number of horizontal video filling positions; and
fill, according to a publishing time in an order of near-to-far from a current system time, the horizontal video filling positions of the first horizontal sliding list corresponding to each updated video group with an updated video in each updated video group, respectively, to generate the user-dimensional horizontal sliding list corresponding to the at least one followed user.

17. The apparatus according to claim 16, wherein the processor is further configured to:
jump to a video playing interface to play a target updated video according to selection of a user on a target updated video in the user-dimensional horizontal sliding list corresponding to a target user; and
obtain a video associated with the target updated video according to a sliding operation input by the user in the video playing interface, and playing the obtained video associated with the target updated video in the video play interface.

18. The apparatus according to claim 17, wherein the processor is further configured to:
add a plurality of videos in the user-dimensional horizontal sliding list corresponding to the target user to a preview window; and
display the preview window inside the video playing interface, so that the user previews videos except for the target updated video in the target user dimensional horizontal sliding list through the preview window.

19. The apparatus according to claim 18, the preview window comprises a sliding preview window, and
wherein the sliding preview window is configured to display a preset number of videos in the user-dimensional horizontal sliding list corresponding to the target user in real time, and a video initially presented in the sliding preview window is associated with a video initially played in the video playing interface.

20. A non-transitory computer readable storage medium, having a computer program stored thereon, when the computer program is executed by a processing apparatus, the method for displaying followed user information according to claim 1 is implemented.

\* \* \* \* \*